Patented Oct. 28, 1952

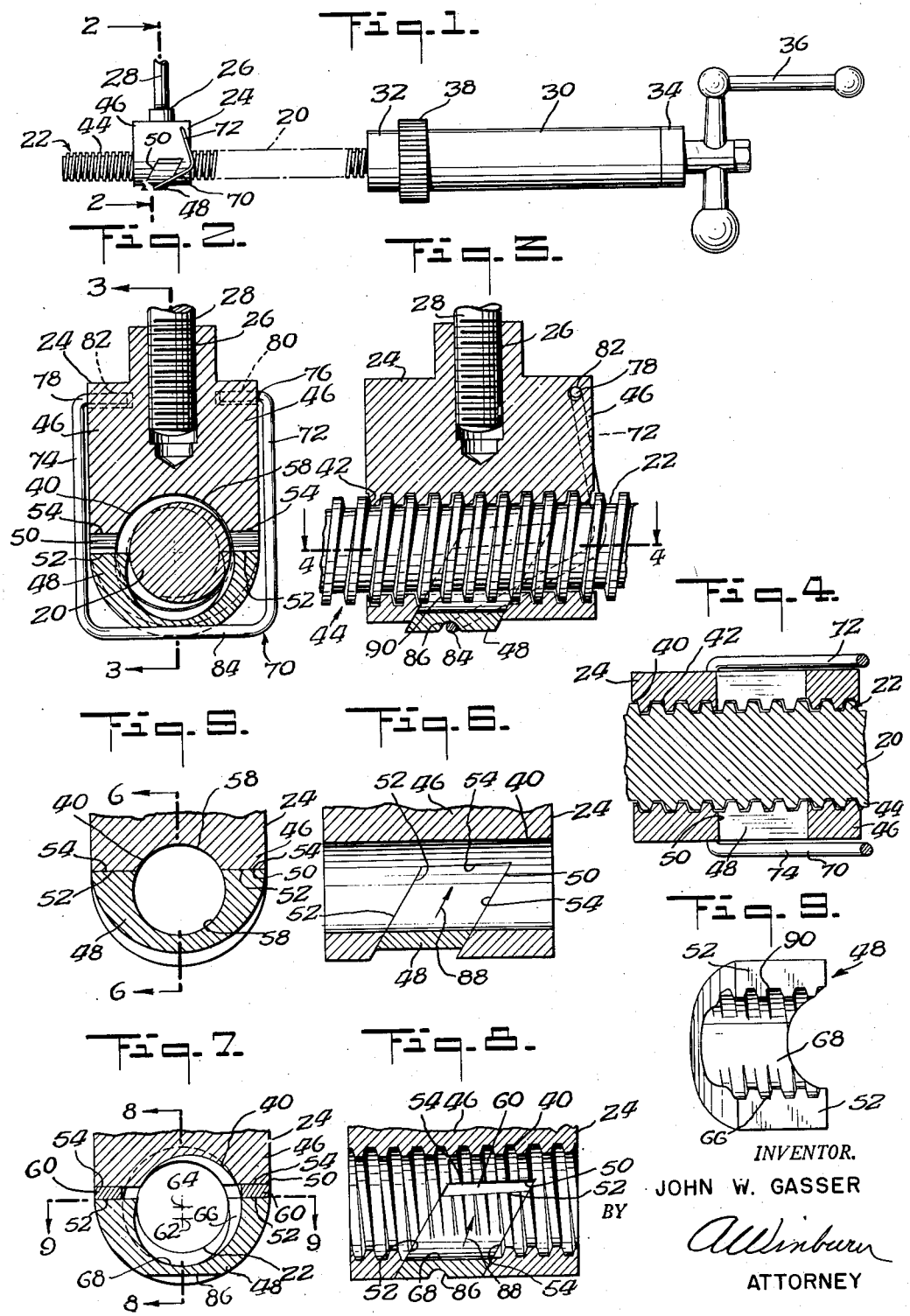

2,615,348

UNITED STATES PATENT OFFICE 2,615,348

MEANS FOR TAKING UP SLACK IN LEAD SCREW DEVICES

John William Gasser, Woodside, N. Y.

Application September 20, 1950, Serial No. 185,880

7 Claims. (Cl. 74—441)

This invention relates to the engagement of threaded parts with each other, and particularly to the enhancement of the fit of such parts together to avoid play or looseness therebetween.

An object of the invention is to provide an improved form of nut for engagement with a threaded screw or shaft, and so constructed and arranged, whereby the nut fits tightly upon the screw, without any play therebetween.

Another object of the invention is to provide an improved form of nut for engagement with a threaded screw or shaft, the nut having a portion thereof resiliently biased into closer engagement with the threads of the screw than the rest of the nut, so that substantially no play or clearance exists between said nut portion and the screw threads.

Still another object of the invention is to provide means for eliminating or substantially reducing any usual play between threadedly engaged parts without the need for expensively machining the parts to close tolerances, ordinary commercial tolerances being sufficient.

A further object of the invention is to provide means for automatically taking up wear between threadedly engaged parts.

Still a further object of the invention is to provide a novel combination of screw threaded shaft and nut, for threaded engagement mutually therebetween, in which means are provided for minimizing or eliminating the normal play therebetween, and which is simple in construction, inexpensive to manufacture, and adaptable for use with all types of threaded parts.

This invention represents an improvement over the patent application of Milo Horsky, Serial Number 63,810, filed December 6, 1948, for Means for Taking Up Slack in Lead Screw Devices, the said application having been assigned to applicant by a duly recorded assignment.

Other objects and advantages of the invention will become apparent from the following description of a preferred embodiment thereof, as illustrated in the accompanying drawings, and in which, Figure 1 is an elevational view showing a lead screw, with my novel nut disposed thereon in operative position.

Fig. 2 is a sectional elevation taken on plane 2—2 of Figure 1.

Figure 3 is a longitudinal sectional elevation taken on plane 3—3 of Figure 2.

Figure 4 is a sectional plan view taken on plane 4—4 of Figure 3.

Figure 5 is a fragmentary sectional elevation taken substantially on plane 2—2 of Figure 2, but during a stage of manufacture of the device, when not yet finished.

Figure 6 is a sectional elevation taken on plane 6—6 of Figure 5.

Figure 7 is a sectional elevation similar to that of Figure 5, but showing the mutual relation of the parts during a later stage of the manufacture, during which shims are employed before threading the bore.

Figure 8 is a sectional longitudinal elevation taken on plane 8—8 of Figure 7.

Figure 9 is a detail plan view taken substantially on plane 9—9 of Figure 7, but showing only the nut tightener portion of the nut, following the threading operation.

In providing threaded engagement between threaded parts, such as a shaft and a nut, or the like, it is frequently difficult to machine the parts to a suitable degree of fit without undergoing considerable expense, especially where the desired fit is closer than the normal commercial tolerances. This is satisfactory when there is spreading force between the threaded shaft or screw and the nut threaded thereon, since the tolerance therebetween is not important, tightening of the screw or nut serving to take up any inherent looseness therebetween.

But when the threaded part is a lead screw on a lathe, which serves to advance a tool threadedly supported thereon, or a micrometer or other precision tool, then any play or tolerance in the threaded engagement will prevent accuracy in machining. Accordingly the present invention provides means whereby a threaded shaft, as for example, a lead screw, may be engaged by another part, such as one carrying a tool for use in a lathe, with a minimum or even entire absence of play therebetween.

In order to understand clearly the nature of the invention and the best means for carrying it out, reference may now be had to the drawings, in which like numerals denote similar parts throughout the several views.

For purposes of illustration, I have shown a shaft 20 which is threaded at 22 by a thread for engagement with a nut 24, having a threaded recess 26 for the reception of the lower end of the post 28 for the support on the post 28 of a tool or other part of the lathe. A bearing is shown at 30, and having an axial bore extending therethrough to receive the unthreaded right hand portion of the shaft 20 shown in Figure 1, the bearing being secured in any suitable manner in the lathe frame or other desired portion thereof.

Axial motion of the shaft 20 relative to the bearing 30 is blocked by means of the collars 32 and 34 as is well known in the art, or otherwise, so that the shaft 20 is constrained to rotational motion only.

Turning of the shaft 20 may be accomplished by means of the handle or crank 36, or in any other suitable manner, as by means of power supplied to a gear 38 secured to and rotatable with the shaft 20.

It will be seen that the nut 24 has an axial bore 40, which is threaded as shown at Figures 3 and 4, with threads 42 to engage with the threaded portion 44 of the shaft 20. The illustrations show to extent, as will be understood by those skilled in the art, the clearance between the threads of the shaft 20 and the threads of the bore 40 of the nut. It is this clearance which causes considerable looseness between the nut and shaft, and is difficult to represent in the drawing without considerable exaggeration and enlargement of the parts.

My purpose is to take up all or a portion of such clearance of at least one portion of the nut 24, so that such clearance is of no effect once the invention is applied. For simplicity of reproduction and production, the nut 24 is divided into two parts, a main part 46 or nut body, and an auxiliary part 48, the part 48 or nut tightener being movable with respect to the main body 46, and fitting into a slot 50 cut into the main body 46 of the nut 24. It will be seen that the parallel side walls 54 of the slot 50 are more inclined toward the axis of the shaft 20, as seen in Figures 1 and 6 and 8, than the inclination of the axes of the sides of the threads of the shaft and of the main body portion 46 of the nut 24.

We may, for convenience, speak of the portion 48, of the nut, which effects the wedging action, as the nut tightener, since that is what it does. Having formed the inclined slot 50 in the main nut body 46, we then form the nut tightener 48, which may be of the same material as the main nut body 46, and of dimensions to fit smoothly into the slot 50 for free sliding movement therein, but with a minimum of play in a direction parallel to the axis of the screw shaft 20.

It is noted that the nut tightener 48 is generally semi-cylindrical, as seen best in Figures 5, 6 and 9, and that it is first inserted into the slot 50, in the manner of Figures 5 and 6, with its surfaces 52 brought into contact with the corresponding surfaces 54 of the slot 50. A bore 58 is then formed through the combined nut body 46 and the nut tightener 48 while they are held in this position shown in Figures 5 and 6.

Then the nut tightener 48 is moved outwardly from the position shown in Figures 5 and 6, to the position shown in Figures 7 and 8, so that there is spacing between the surfaces 54 of the nut body and the surfaces 52 of the nut tightener, and shims 60 are then placed in the space between the surfaces 52 and 54 in the manner of Figures 7 and 8. Then, with the parts in this relative position of Figures 7 and 8, the bore 58 is then threaded right through the nut body 46 and the nut tightener 48. However, it is seen that the use of the shims 60 has moved the nut tightener axis 62 outwardly from the axis 64 of the bore 58 of the nut body 46. Hence, as the threads 42 are formed through the combined parts of the nut and nut tightener, it is clear that only the sides of the bore of the nut tightener will be cut through by the threading tool, as at 66 in Figures 7 and 9, whereas the central portion 68 of the nut tightener bore will not be threaded. Figure 9 shows how the interior of the nut tightener looks when the threading operation is completed.

Then the shims 60 are removed and the parts allowed to resume the positions shown in Figure 5, that is, with the surfaces 52 and 54 substantially in mutual contact. It is seen that the bore portion in the nut tightener 48 occupies more than 180 degrees, as seen in Figure 5.

A spring member 70 has a pair of legs 72 and 74, the ends 76 and 78 of which are bent inwards to seat in recesses 80 and 82 in the sides of the nut body 46. A web 84 extends across the outer surface of the nut tightener 48, and into a groove 86 formed therein. The spring member 70 exerts a continuous bias upon the nut tightener, so as to urge the same in the direction toward the screw 22, in the direction generally indicated by the arrow 88 of Figures 6 and 8.

As seen in Figure 3, the result is to cam the sides 90 of the fully threaded portions of the nut tightener bore against the abutting side of the screw threads of the screw 20, so as to take up any clearance therebetween. As the screw 20 turns for some time, the tendency is to wear threads further and further into the unthreaded portion 68 of the nut tightener 48, and thus to compensate for wear.

It is seen that the fact that the nut tightener bore is more than 180 degrees, as seen in Figures 5 and 7, will retain the nut tightener on the screw 22, against dislodgment even when the spring 72 is not in position. Hence, to assemble the parts, it is necessary to first assemble the nut tightener to the nut body, with them in the positions shown in Figure 5, and then turn the screw 22 through the assembled bores.

It will be noted that satisfactory results are obtained when the thickness of the shims 60, measured in a vertical direction as seen in Figure 7, is preferably not less than about 80 per cent of the depth of the thread of the screw 22.

As clearly seen in Fig. 1, the oblique movement of the nut tightening member 48 in a direction toward the threaded bore of the nut body 24 is limited by the bottom walls of the slotted opening 50 to thereby prevent locking of the said nut tightening member 48 with respect to the threaded shaft.

Although I have described my invention in specific terms, it will be understood that various changes may be made in size, shape, materials and arrangement without departing from the spirit and scope of the invention as claimed.

I claim:

1. A nut for engagement with a threaded shaft, comprising a main nut body having a bore threaded to engage with said threaded shaft received therein, said nut having an oblique slot formed therein, and a nut tightening member disposed in said slot and movable therein in an oblique direction with respect to the axis of said bore and having only portions of the inner surface thereof threaded leaving other parts thereof unthreaded, said threaded portions being adapted to engage with the threads of said threaded shaft to take up any play between the main nut body and the threaded shaft, means for limiting the movement of said nut tightening member in a direction toward said bore whereby to prevent locking and resilient means biasing said nut tightening member toward said engagement with said threaded shaft.

2. The construction according to claim 1, wherein said resilient means comprises resilient means carried by said main nut body, and having a portion of said resilient means engaging said nut tightening means to bias the same toward said threaded shaft.

3. The construction according to claim 1, wherein said resilient means comprises a web extending across the outer portion of said nut tightening means in the path of movement thereof out of said slot, and resilient legs connected to said web and extending into engagement with said main nut body.

4. A nut for engaging with a threaded shaft comprising a main nut body having a bore threaded to engage with the said threaded shaft received therein, said nut body having a slot formed therein, a nut tightening member movably disposed in said slot, said nut tightening member having a predetermined circular portion of a bore formed therein, only portions of said nut tightening member bore adjacent opposite edges thereof being threaded, leaving a center portion thereof unthreaded, said last named threaded portions of said bore of said nut tightening member being threaded for engagement with a portion of said threaded shaft, to take up any play between said main nut body and the threaded shaft, means for normally resiliently urging the movement of said nut tightening member in a direction toward said threaded shaft, means for guiding the said movement of said nut tightening member in said slot and in an oblique path with respect to the axis of said nut tightening member bore and means for limiting the oblique movement of said nut tightening member in a direction toward said bore of said nut body to prevent locking.

5. The construction according to claim 4 wherein said predetermined circular portion of said bore in said nut tightening member is equivalent to more than 180 degrees of a complete circle.

6. In combination, a threaded shaft and a nut member engaged on said shaft, said nut member comprising a main nut body having a bore threaded to engage with said shaft, said nut body having a slot formed therein, a nut tightening member movably disposed in said slot, said nut tightening member having a circular portion of a bore formed therein equivalent to more than 180 degrees of a complete circle, portions adjacent opposite edges only of said partial circular portion of the bore of said nut tightening member being threaded for engagement with a portion of said threaded shaft to take up any play between said main nut body and the threaded shaft, means for normally resiliently urging the movement of said nut tightening member in a direction toward said threaded shaft, means for guiding the said movement of said nut tightening member in said slot and in an oblique path with respect to the axis of said bore and means for limiting the oblique movement of said nut tightening member in a direction toward said bore of said nut body to prevent locking.

7. The construction according to claim 6 wherein the axis of said nut tightening member is displaced from coincidence with the axis of said nut body, by a distance of not less than approximately 80 percent of the depth of the threads formed in said shaft.

JOHN WILLIAM GASSER.

REFERENCES CITED

The following references are of record in the file of this patent:

UNITED STATES PATENTS

| Number | Name | Date |
| --- | --- | --- |
| 1,153,861 | Dudley et al. | Sept. 14, 1915 |
| 1,726,377 | Armitage | Aug. 27, 1929 |
| 2,204,693 | Parsons | June 18, 1940 |
| 2,485,464 | Stott | Oct. 18, 1949 |
| 2,493,000 | Linsley | Jan. 3, 1950 |